United States Patent Office 3,536,498
Patented Oct. 27, 1970

3,536,498
PRODUCING SAKE AND BAKER'S
DRY YEASTS
Toshichi Ano and Koji Akawakami, Kumamaota-shi, and Kensaku Endo, Machida-shi, Japan, assignors to Kyowa Hakko Kogyo Co., Ltd., Tokyo, Japan, a corporation of Japan
No Drawing. Filed Aug. 3, 1967, Ser. No. 658,056
Claims priority, application Japan, Aug. 3, 1966, 41/50,525; Aug. 5, 1966, 41/51,088
Int. Cl. A23j 1/18; C12c 11/00
U.S. Cl. 99—96
8 Claims

ABSTRACT OF THE DISCLOSURE

A process for the preparation of sake or baker's dry yeasts which comprises adding at least one amino acid to concentrated yeast liquor and then drying the resulting mixture. Exemplary additive amino acids include leucine, isoleucine, lysine, glutamates and phenylalanine. Yeasts made by this process possess a good thermal resistivity and impart an excellent fragrance to bread manufactured therefrom.

---

The present invention relates to a process for producing sake and baker's dry yeasts. More particularly, the present invention relates to a process for producing said yeasts by adding substances thereto which have the protective action of thermal resistance and which promote the production of a fragrant flavor component in the sake fermentation and in the manufacture of bread.

Recently a method of using compressed yeast has been developed. This method has found widespread use and has received favorable comments in the industry. However, with compressed yeast, there is the disadvantage that close attention must be paid to managing the preservation and the transportation thereof. The treatment and preservation of yeast in the dry state, however, is very easy and simple.

However, in the conventional method of the prior art, the dead ratio of yeast is high and its use value decreases. Therefore, it has not been put to practical use. Nevertheless, attempts have been made in this direction. For example, a method of spray drying has recently been developed as a way of producing baker's dry yeast (Japanese patent publication Nos. 146/1966 and 1074/1966). However, further improvement is yet needed under the existing circumstances with respect to the flavor of bread produced from such yeast.

Accordingly, one of the objects of the present invention is to provide an improved process for the production of sake and baker's dry yeast which overcomes the disadvantages and deficiencies of the prior art methods.

Another object of the present invention is to obtain sake yeast which resists a decrease in its yeast activity by giving it a thermal resistance property in drying, which retains a strong fermentation power, which produces a superior flavor and, furthermore, is in a form which makes the use thereof efficacious and easy.

A further object of the invention is to provide baker's dry yeast of superior quality which also has the property of resisting heat upon drying, thereby preventing a decrease in its yeast activity, which retains a strong dough fermentation power and which, furthermore, provides an excellent flavor in manufacturing bread.

These and other objects and advantages of the present invention will become apparent to those skilled in the art from a consideration of the following specification and claims.

In order to solve the above-mentioned problems, the present inventors investigated various additives which provided a protective action of thermal resistance to yeast in drying. This research has led to the present invention.

In accordance with the present invention, it has been found that the above-mentioned objects may be obtained if amino acid compounds are added to the yeast. It is assumed that the effect of the amino acids depends upon protecting the cells by creating a buffer action with an amphoteric property with the state of charge of the yeast cell membrane and by preventing heat denaturation corresponding to an abrupt charge of constitution in situ accompanying the evaporation of internal and external water in the process of drying.

Furthermore, it has been found that a small intake of amino acids by yeast cells results when amino acids are added to yeast. Accordingly, the absorbed amino acids are incorporated into the process of producing the flavor component in the fermentation metabolism system of yeast. Moreover, the amino acids contained in the dry product become the precursor of the production of flavoring compounds. As a result, sake with a superior flavor is obtained and, in the case of bread, a superior flavor is generated in dough fermentation and baking.

In accordance with a further embodiment of the present invention, it has been recognized that non-ionic surface active agents such as monoglycerides have a protective action on the cells and are also effective for the production of a fragrant flavor component. Accordingly, when monoglycerides are used in combination with amino acids, the effect is even more significant.

Any of the amino acids may be used in the present invention. Preferred amino acids are leucine, lysine, sodium glutamate and phenylalanine. Mixtures of these amino acids may be employed and, as noted above, mixtures of one of more than one amino acid together with monoglycerides may also be used. The amount of amino acid compounds and/or monoglycerides added to the concentrated yeast liquor ranges from about 0.05 to 10.0% by weight with respect to the amount of compressed yeast.

The following two experiments show some of the features of the present invention.

EXPERIMENT 1

The additives shown in Table 1 below, in the amounts shown therein, were added to concentrated yeast liquor, and the solution mixture was sufficiently stirred for 30 minutes and then dried by an atomizer-type spray drier. Obtained was dry yeast in the dust state having a water content of 8–10%. The dead ratio thereof and the fermentation power as determined by the Meissel method were examined; the results are shown in Table 1.

It should be noted that the decrease of fermentation power was small compared with the case where no additive was made. Furthermore, as a result of an organoleptic test of flavor of the fermented sugar solution tested according to the method of Meissel, an excellent flavor was found in the cases where an addition was made, as contrasted with the case where on addition was made to the yeast. Accordingly, this confirms that the present invention is an excellent process for producing sake dry yeast.

TABLE I

| Additive | Amount added to compressed yeast, percent by weight | Dead ratio [1] | | Fermentation power [2] | | Flavor [3] | Water content, percent by weight |
|---|---|---|---|---|---|---|---|
| | | Immediately after drying, percent | 20° C. after 20 days, percent | Immediately after drying, mg. | 20° C. after 20 days, mg. | | |
| Leucine | 1.0 | 33 | 41 | 630 | 586 | 2 | 8.0 |
| Isoleucine | 1.0 | 27 | 33 | 595 | 555 | 2 | 9.5 |
| Lysine | 2.0 | 29 | 35 | 723 | 670 | 2 | 10.0 |
| | 5.0 | 48 | 50 | 450 | 420 | 1 | 9.5 |
| Sodium glutamate | 2.0 | 25 | 30 | 696 | 655 | 2 | 9.0 |
| | 10.0 | 60 | 70 | 420 | 400 | 1 | 9.0 |
| Phenylalanine | 0.5 | 28 | 35 | 580 | 539 | 3 | 10.6 |
| Monoglyceride | 1.0 | 30 | 38 | 650 | 600 | 2 | 8.5 |
| No addition | | 87 | 95 | 250 | 100 | 0 | 9.5 |

[1] "Dead ratio": This was obtained by a methylene blue staining method. A color solution of 1/5,000 methylene blue at a pH of 4.6 was prepared by mixing equivalent amounts of 1/5,000 methylene blue solution and N/5 phosphate buffer solution. Next, 0.2% of a dry yeast suspension was prepared and one ml. of the said suspension and one ml. of the color solution were mixed. The "dead ratio" was then determined by counting a portion of the cells stained to deep blue within 5 minutes by using a thoma blood corpuscle counter.
[2] "Fermentation power": Meissel's method provided by the Yeast Industry Association was used therefor. Namely, 4.0 g. of officinal glucose was put into a prescribed fermentation bottle and thereto 20 ml. of distilled water at 30° C. was added and dissolved. Ten ml. of the solution containing 0.25 g. of $KH_2PO_4$ and $(NH_4)_2HPO_4$ each was added to the said glucose solution; then 0.75 g. of dry yeast dissolved in 20 ml. of distilled water was added. After shaking, an absorption tube containing about 5 ml. of sulfuric acid was attached to the fermentation bottle. Fermentation was conducted at 30° C. for five hours in a thermostat at 30° C. The difference between the weight measured before fermentation and that measured afterwards gives the amount of $CO_2$ generated. This value was regarded as the fermentation power.
[3] "Flavor": This was determined by an organoleptic test by the smell of a sugar solution after determining the fermentation power. The order of magnitude for flavor was classified as follows:
0: Normal without any special flavor;
1: Slight fragrance;
2: Excellent fragrance;
3: Extremely excellent fragrance.

EXPERIMENT 2

Additives shown in Table 2, in the amounts shown therein were added to compressed yeast liquor the same as in Experiment 1. The solution mixture was sufficiently stirred for 30 minutes. Subsequently, it was dried by an atomizer-type spray drier. Dry yeast in a dust state containing 8–10% by weight of water was obtained.

The results of tests on the dough fermentation power thereof are shown in Table 2. A decrease in fermentation power was not observed when the noted additions were made to the yeast. In contrast thereto, a significant decrease in fermentation power took place when no addition was made. Furthermore, an organoleptic test of flavor of a constant quantity of dough after two hours of fermentation was conducted. An organoleptic taste of flavor of the bread prepared after a manufacturing test was also made. In each case, an excellent flavor was obtained, as compared with the case where no addition of additive was made. Accordingly, this confirms that the present invention is an advantageous process for the production of baker's dry yeast.

TABLE 2

| Additive | Amount added to compressed yeast (percent by weight) | Dough fermentation power [1] | Dough flavor [2] | Bread flavor [3] | Water content (by weight) |
|---|---|---|---|---|---|
| Leucine | 1.0 | 480 | 2 | 2 | 9.5 |
| Insoleucine | 1.0 | 470 | 2 | 2 | 10.0 |
| Lysine | 2.0 | 490 | 2 | 2 | 8.0 |
| Sodium glutamate | 2.0 | 470 | 2 | 2 | 9.5 |
| Phenylalanine | 0.5 | 450 | 3 | 2 | 8.5 |
| Monoglyceride | 1.0 | 460 | 2 | 2 | 10.0 |
| No addition | | 250 | 0 | 0 | 9.0 |

[1] Dough fermentation power: This was measured by the following test method according to the dough fermentation power-measuring method provided by the Yeast Industry Association. 100 g. of wheat flour, 20 g. of sugar, 1 g. of sodium chloride and 1 g. of dry yeast were mixed, and 55 ml. of water was added thereto; mixing was then effected in a mixer for 2 minutes. The dough was packed into a measuring cylinder and fermentation was conducted at 30° C. for 2 hours. The dough fermentation power was shown by the resulting dough volume (ml.).
[2] Dough flavor: An organoleptic test by the smell of the dough after measuring the dough fermentation power was conducted. The order of magnitude for flavor was classified as follows:
0: Normal, without any specific flavor;
1: Slight flavor;
2: Excellent flavor;
3: Extremely excellent flavor.
[3] Bread flavor: Bread manufacturing was conducted according to the A.A.C.C. (American Association of Cereal Chemists) official standard bread manufacturing test method. After the lapse of a day, a slice (7 x 7 x 1.5 cm.) of a crumb part was made and, then, an organoleptic test of the flavor was conducted. The order of magnitude thereof was classified the same as with the dough flavor.

The blending and process in manufacturing the test bread were as follows:

Wheat flour—100 g.
Sodium chloride—1.5 g.
Sugar—5 g.
Dry yeast—1 g.
Water—33 ml.
Mixing—2 minutes
First fermentation—105 minutes
Second fermentation—50 minutes
Third fermentation—25 minutes
Fourth fermentation—55 minutes
Baking—25 minutes The following examples are given merely as illustrative of the present invention. Unless otherwise noted, the percentages in the examples and throughout the application are by weight.

EXAMPLE 1

Five grams of lysine hydrochloride was dissolved in one liter of concentrated sake yeast liquor (70% w./v. as compressed yeast) and sufficiently stirred and mixed for 30 minutes. The resulting liquor was dried at a temperature of blowing of 125° C. with an outlet temperature of 70° C. by an atomizer-type spray drier. Dry yeast having a water content of 9.0% was obtained.

EXAMPLE 2

Fourteen grams of lysine was dissolved in 1 liter of concentrated yeast liquor (70% w./v. as compressed yeast). Thereto, monoglyceride in a pasty state, obtained by adding water to 12 grams of monoglyceride and heating, was added. The mixture was then stirred vigorously for 30 minutes so as to make the monoglyceride disperse sufficiently. Thereafter, the mixture was dried in the same manner as described in Example 1 while stirring. Dry yeast having a water content of 10.0% was obtained.

EXAMPLE 3

4.5 grams of phenylalanine was dissolved in 1 liter of concentrated yeast liquor (70% w./v. as compressed yeast) and stirred for an hour. Subsequently, the resulting liquor was dried in the same manner as described in Example 1. As a result, dry yeast having a water content of 8.5% was obtained.

EXAMPLE 4

28 grams of sodium glutamate was dissolved in 1 liter of concentrated yeast liquor (70% w./v. as compressed yeast) and sufficiently stirred for 30 minutes. Thereafter, the resulting liquor was dried the same as described in Example 1. Dry yeast having a water content of 8.5% was obtained.

EXAMPLE 5

18 grams of ammonium glutamate and 4 grams of lecithin were dissolved into 1 liter of concentrated yeast liquor (70% w./v. as compressed yeast) and sufficiently stirred for 30 minutes. Subsequently, the resulting liquor was dried the same as set forth in Example 1. Dry yeast having a water content of 9.0% was obtained.

EXAMPLE 6

5 grams of calcium glutamate and 4 grams of lecithin were dissolved in 1 liter of concentrated yeast liquor (70% w./v. as compressed yeast) and sufficiently stirred for 30 minutes. The resulting liquor was again dried the same as described in Example 1. As a result, dry yeast having a water content of 8.0% was obtained.

EXAMPLE 7

14 grams of lysine was dissolved into 1 liter of concentrated yeast liquor (70% w./v. as compressed yeast) and sufficiently stirred and mixed. Thereafter, the resulting liquor was dried at a temperature of blowing air of 125° C., with an outlet temperature of 70° C. by an atomizer-type spray drier. Dry yeast having a water content of 9.0% was obtained.

EXAMPLE 8

14 grams of lysine was dissolved in 1 liter of concen-yeast liquor (70% w./v. as compressed yeast). A monoglyceride in a pasty state, obtained by adding water to 7 grams of monoglyceride and heating, was added thereto and stirred vigorously for 30 minutes so as to disperse the monoglyceride sufficiently. Drying thereof was then effected with a flow of air having a temperature of 78° C. As a result, dry yeast having a water content of 10.0% was obtained.

EXAMPLE 9

3.5 grams of phenylalanine was dissolved in 1 liter of concentrated yeast liquor (70% w./v. as compressed yeast) and stirred for one hour. The resultant mixture was dried according to the same method as described in Example 8. Dry yeast having a water content of 8.5% was thereby obtained.

EXAMPLE 10

14 grams of sodium glutamate was dissolved in 1 liter of concentrated yeast liquor (70% w./v. as compressed yeast) and stirred for 30 minutes. Spray drying thereof was conducted according to the same method as described in Example 7. Dry yeast having a water content of 8.0% was obtained.

EXAMPLE 11

27 grams of sodium glutamate and 7.3 grams of leucine were dissolved in 1 liter of concentrated yeast liquor (70% w./v. as compressed yeast) and sufficiently stirred for 30 minutes. Spray drying thereof was conducted the same as described in Example 7. As a result, dry yeast having a water content of 8.5% was obtained.

EXAMPLE 12

15 grams of ammonium glutamate and 4 grams of lecithin were dissolved in 1 liter of concentrated yeast liquor (60% w./v. as compressed yeast) and sufficiently stirred for 30 minutes. Spray drying thereof was conducted in the same manner as described in Example 7. Dry yeast having a water content of 8.0% was obtained as a result.

EXAMPLE 13

5 grams of calcium glutamate and 4 grams of lecithin were dissolved in 1 liter of concentrated yeast liquor (60% w./v. as compressed yeast) and sufficiently stirred for 30 minutes. This mixture was spray dried according to the same method as described in Example 7. As a result, dry yeast having a water content of 8.5% was obtained.

The invention being thus described, it will be obvious that the same may be varied in many ways. Such variations are not to be regarded as a departure from the spirit and scope of the invention, and all such modifications as would be obvious to one skilled in the art are intended to be included herein.

We claim:
1. A process for the preparation of a yeast selected from the group consisting of sake and baker's dry yeasts which comprises adding about 0.05% to about 10% by weight, based on the amount of compressed yeast, of at least one amino acid selected from the group consisting of leucine, isoleucine, lysine, glutamates and phenylalanine to concentrated yeast liquor and then drying the resulting mixture at a temperature of 78 to 125° C. to a water content of 8–10% by weight.

2. The process of claim 1, wherein a monoglyceride is also added to said yeast liquor.

3. The process of claim 2, wherein said monoglyceride is added in an amount of from about 0.05% to about 10% by weight, based on the amount of compressed yeast.

4. The process of claim 1, wherein the mixture is dried with hot air having a temperature of from about 78° to 125° C.

5. A process for the preparation of sake dry yeast which comprises adding from about 0.05% to about 10% by weight, based on the amount of compressed yeast, of at least one amino acid selected from the group consisting of leucine, isoleucine, lysine, glutamates and phenylalanine to concentrated yeast liquor and then drying the resulting mixture at a temperature of 78 to 125° C. to a water content of 8–10% by weight.

6. The process of claim 5, wherein a monoglyceride is also added to said yeast liquor.

7. A process for the preparation of baker's dry yeast which comprises adding from about 0.05% to about 10% by weight, based on the amount of compressed yeast, of at least one amino acid selected from the group consisting of leucine, isoleucine, lysine, glutamates and phenylalanine to concentrated yeast liquor and then drying the resulting mixture at a temperature of 78 to 125° C. to a water content of 8–10% by weight.

8. The process of claim 7, wherein a monoglyceride is also added to said yeast liquor.

References Cited

UNITED STATES PATENTS

| | | | |
|---|---|---|---|
| 1,970,275 | 8/1934 | Buhrig et al. | 99—96 X |
| 2,894,842 | 7/1959 | Mitchell | 99—96 |
| 3,041,249 | 6/1962 | Chen et al. | 195—74 |
| 3,407,072 | 10/1968 | Aizama et al. | 99—96 |

OTHER REFERENCES

Cook, A. H. "The Chemistry and Biology of Yeasts." Academic Press Inc., 1958, New York, N.Y. (pp. 282–285).

LIONEL M. SHAPIRO, Primary Examiner

D. M. NAFF, Assistant Examiner

U.S. Cl. X.R.

195—74

UNITED STATES PATENT OFFICE
CERTIFICATE OF CORRECTION

Patent No. 3,536,498　　　　　　　　Dated October 27, 1970

Inventor(s) Toshichi Ano, Koji Kawakami, and Kensaku Endo

It is certified that error appears in the above-identified patent and that said Letters Patent are hereby corrected as shown below:

Column 1, line 4, the name "Akawakami" should read --Kawakami--.

Signed and sealed this 21st day of December 1971.

(SEAL)
Attest:

EDWARD M. FLETCHER, JR.　　　　ROBERT GOTTSCHALK
Attesting Officer　　　　　　　　Acting Commissioner of Patents